(12) United States Patent
Sklyarevich et al.

(10) Patent No.: US 6,408,649 B1
(45) Date of Patent: Jun. 25, 2002

(54) METHOD FOR THE RAPID THERMAL TREATMENT OF GLASS AND GLASS-LIKE MATERIALS USING MICROWAVE RADIATION

(75) Inventors: Vladislav E. Sklyarevich; Mykhaylo Shevelev, both of Feasterville, PA (US)

(73) Assignee: Gyrotron Technology, Inc., Bristol, PA (US)

( * ) Notice: Subject to any disclaimer, the term of this patent is extended or adjusted under 35 U.S.C. 154(b) by 0 days.

(21) Appl. No.: 09/561,451

(22) Filed: Apr. 28, 2000

(51) Int. Cl.[7] ............................. C03B 23/00; C03B 29/00
(52) U.S. Cl. ........................... 65/102; 65/104; 65/114; 65/115; 65/117; 65/268; 65/269; 65/271; 65/33.2; 65/355; 264/432
(58) Field of Search ........................... 65/102, 104, 114, 65/115, 117, 268, 169, 271, 33.2, 355; 264/432

(56) References Cited

U.S. PATENT DOCUMENTS

| 3,673,288 | A | * | 6/1972  | Childs, Jr.   |
| 4,061,451 | A | * | 12/1977 | Bardet        |
| 4,838,915 | A | * | 6/1989  | Hassler       |
| 4,900,894 | A | * | 2/1990  | Tanaka et al. |
| 4,921,522 | A | * | 5/1990  | Flaming       |
| 5,782,947 | A | * | 7/1998  | Boaz          |

* cited by examiner

Primary Examiner—Michael Colaianni
(74) Attorney, Agent, or Firm—Morgan & Finnegan, LLP

(57) ABSTRACT

A method of thermally treating a glass or glass-like material, preferably a glass sheet, without the use of conventional tunnel-type furnaces, to effect rapid heating of glass and glass-like materials from any initial temperature to any required temperature so that the glass sheet can be processed by shaping, bending, tempering, annealing, coating and floating of the glass sheet without cracking of the glass sheet is described. In the inventive method a microwave radiation with appropriate uniformity, frequency and power density is chosen so as to accomplish glass heating from any initial temperature to any required (e.g., softened) temperature in a selected short time while ensuring that the temperature distribution on the external surfaces and in the interior of the glass sheet that arises from microwave exposure is uniform enough to prevent the exposed glass sheet's internal thermal stress from exceeding its modulus of rupture, thereby avoiding glass breakage.

46 Claims, 5 Drawing Sheets

Prior Art (Heating By Infrared or Convectional Radiation)

METHOD FOR THE RAPID THERMAL TREATMENT OF GLASS AND GLASS-LIKE MATERIALS USING MICROWAVE RADIATION

FIELD OF THE INVENTION

This invention relates to the thermal treatment of any type of glass and glass-like materials, preferably of a glass sheet for shaping, bending, tempering, annealing, coating and float processing by rapidly and uniformly heating the glass sheet with microwave radiation so that the glass sheet can be processed without cracking. Glass and glass-like materials which may be thermally treated by the inventive method include flat glass sheets, glass fibers, organic mixtures incorporating glass and glass-like materials and the like. Glass sheets treated by this method can be used in the production of windshields, side windows and rear windows in vehicles such as automobiles and the like as well as for the production of architectural window glass and the like.

BACKGROUND OF THE INVENTION

Thermal treatment of glass and glass-like materials is widely used for the production of vehicle windows, architectural glass, fiberglass ceilings and composites is and the like. A huge number of glass and glass-like materials and especially glass sheets are thermally treated each year worldwide.

One of the main problems in the thermal treatment of glass (e.g., the shaping or bending of glass sheets), is that the increasing heating rate of these glass sheets must be kept comparatively low when the glass is heated from room temperature to a softened temperature to prevent the glass sheet from cracking. Otherwise, cracking of the sheet can occur if different areas of the glass sheet are heated to different temperatures. This temperature differential between different areas or layers of the sheet raises the internal stresses in the glass to the point where these stresses become higher than the sheet modulus of rupture of the heated glass causing the glass to crack or shatter.

Generally, glass sheets are thermally treated by; conveying the sheets via an appropriate support mechanism through a horizontal tunnel-type furnace; heating them while in the furnace using infrared, hot air, gas or a combination of these methods to a heat softened temperature; and then shaping or bending the glass sheets. After shaping, the glass sheet is transferred to a cooling station where the sheet is controllably cooled. The described process assures that the thermal treatment is conducted at appropriate production rates. Numerous patents (see, e.g., U.S. Pat. Nos. 5,882,370, 5,858,047, 5,743,931, 5,352,263, 5,022,908, 5,079,931, 5,078,774, 5,066,320, 5,059,233, 5,057,138, 5,057,137, 5,032,162, 5,005,318, 4,986,842, 4,983,201, 4,976,762, 4,881,962, 4,816,055, 4,767,439 and 3,951,634) describe different methods of thermally treating glass sheets using tunnel-type furnaces. In all of these methods, the total heating time for each sheet while resident in the furnace is hundreds of seconds.

Productivity of tunnel-type furnaces can be increased, but only in limited ways. The simplest way to increase productivity is to make the furnace longer. A longer furnace allows the conveyer's speed to be increased because the total heating time for each sheet is correspondingly increased, allowing the necessary low temperature differential between the external surfaces and inside layers of the glass sheet to be maintained. However, even without this modification, existing furnaces are too long, massive, expensive and inefficient and have material handling problems.

For example, there is high heat conduction from rollers to glass in tunnel-type furnaces, which together with the convection and radiation heat below the glass results in the amount of heat transferred from the lower surface of the glass exceeding that transferred to the upper surface of the glass through convection and radiation alone. In addition, there is non-uniformity of the glass temperature in the conveying direction that leads to deterioration of the surface quality and optical quality properties of the glass sheets.

Even if the glass sheet is evenly heated within this type of furnace, when the glass sheet is delivered out of the furnace, the leading and trailing ends of the glass sheet are cooled for different periods of time before the glass sheet reaches the pressing/bending position in the shaping/bending device. This can result in cracks in the glass sheet when it is pressed and bended.

Additionally, it is often difficult to reliably accomplish local heating for combined shaping and bending of glass sheets especially in auto and structural glass production when a massive furnace is used. These localized heating operations require expensive furnace modification (see, e.g., U.S. Pat. Nos. 5,735,922, 5,591,245 and 5,755,845) and still cannot guarantee the effective overheating of the limited locations and temperatures needed for bending.

Rather than eliminate the use of tunnel-type furnaces in the thermal processing of glass sheets, most improvements in the art have focused on reducing the size of the furnaces (which reduces the total heating time) without reducing production rate. One of the ways to achieve this goal is to increase the power of the heat applied to the glass at the moment the glass temperature exceeds around 450° C. by creating a separate chamber at the end of the furnace heated by powerful electric or gas heaters having a temperature range of 800° C. to 900° C. (U.S. Pat. No. 5,232,482) or 800° C. to 1000° C. (U.S. Pat. No. 5,306,324). Microwave energy has also been used to reduce the total heating time by treatment with microwave radiation only at the end of the glass heating process starting at a temperature around 420–450° C. (U.S. Pat. Nos. 4,838,915, 4,471,192, 5,656, 053 and 5,822,879).

Another way to reduce furnace length and heating time is to increase heat uniformity. Many patents focus on the solution of problems related to the non-uniform heating of glass including designing heating elements that are separately and independently controllable and which create the necessary distribution of heat by joining infrared and hot air heating (U.S. Pat. Nos. 5,908,000, 5,368,624 and 5,296, 270), designing special heating devices (U.S. Pat. Nos. 6,005,230 and 4,888,038), creating a special temperature gradient over a glass surface (U.S. Pat. No. 5,149,352) and using furnace roller heat (U.S. Pat. No. 4,591,374).

However, as noted above, the common feature of all of the abovementioned patents is that they describe methods to reduce the total heating time of a glass sheet in tunnel furnaces and are not directed to (or capable of) eliminating this type furnace in glass processing. Thus, there is a clear need in the art for a method for the rapid heating of glass sheets which eliminates tunnel type furnaces or which shortens their length considerably to make them more effective and less expensive. A need also exists for a treatment method that can ensure high-speed heating of narrow, localized places on a glass sheet.

The main problem with increasing the rate of heating is the inevitability of creating temperature differences between the interior and the external surfaces of the glass sheets. As discussed above, different patents describe the equalization of infrared or convection heat on glass surfaces. Microwave heaters can be employed for this purpose as well (see, e.g., U.S. Pat. No. 5,828,042, U.S. patent application Ser. No. 09/439,533 filed Nov. 12, 1999). Hypothetically, the methods described therein at least provide a way to keep this temperature differential to a minimum on the external glass surface or surfaces. However it is extremely difficult to reduce the temperature differential throughout the thickness of the glass sheet without changing its properties.

The unsuitability of conventional radiation sources for the rapid heating of a glass sheet is illustrated by the following example and FIG. 1. Glass highly absorbs infrared radiation and is opaque to hot air and gas as well. Thus, when infrared or convection heat 1 transmitted by hot air, a gas, or the like interacts with a glass sheet 2 the main portion of the power is absorbed by the thin layers of the glass located at the external surfaces of the glass sheet, 2a and 2z. This natural phenomenon creates a temperature differential (represented as temperature profile curves 3, 4 and 5) in the interior of glass sheet 2 between the external glass surfaces 2a and 2z and a plurality of interior glass layers (e.g., 2b, 2c, 2d, ... 2n), as well as between different layers within the glass, such that the temperature of the most interior layers (e.g., 2n) is lower than the temperature at the external surfaces of the glass sheet, 2a and 2z. If the heating time is long enough (i.e. the rate of heating is low enough), the thermal conductivity of the glass sheet can lessen the temperature differential as depicted by temperature profile curve 3. But if the increasing heating rate is high, the temperature differential between the interior layers (e.g., 2c, 2n) and the external surfaces of the glass sheet, 2a and 2z, increases (temperature profile curve 4) and the higher rate of heating creates an even higher resultant temperature differential (temperature profile curve 5) between these layers. This temperature differential, in turn, give rise to an internal stress in the glass sheet that leads to glass breakage. The value of the temperature differentials mainly depends on the absorption properties of the glass for infrared or convectional radiation and its thermal conductivity and consequently limits the ability to heat with a high increasing heating rate.

Since the usual function of glass is to protect an object from infrared and heat To radiation, most kinds of glass and glass-like materials, especially window type glass, absorb infrared very well and have very low thermal conductivity. Thus, the time necessary for heating glass by heat sources that do not have the ability to penetrate inside the glass has a natural limit that cannot be reduced because this leads to breakage. This limitation in heating time can be estimated through the solution of a heat equation that describes the spread of heat inside a glass sheet that is irradiated, for example, by infrared radiation. This equation can be written in the following form (see for example *Conduction of Heat in Solids* by J. C. Jaeger (contributor), Horatio S. Carslaw, $2^{nd}$ edition, Oxford University Pres, 1986):

$$\partial T/\partial t = \eta/(c\rho)\Delta T + Q/(c\rho)$$

The heat transfer (q) from the external surfaces of the glass sheet can be written in the following form:

$$q = k(T(0,t) - T_0) + \beta\sigma(T(0,t)^4 - T_0^4),$$

where $T = T(x,t)$ is the temperature distribution along the (x) axis (throughout glass thickness) for irradiation time (t) and $0 < x < \delta$, $\delta$ is the thickness of the glass; $T(0,t)$ is the temperature of the glass surface vs. time (t) starting from room temperature $T_0$, $\eta$ is the glass thermal conductivity, c is the specific heat of the glass, $\rho$ is the glass density, k is the coefficient of heat transfer, $\beta$ is the total emissivity of the glass, $\sigma$—Stefan-Boltzmann constant (see *Handbook of Chemistry and Physics* $80^{th}$ edition, CRC Press LLC 1999), q is the flow of heat from the glass surface and $Q = Q(x)$ is the distribution of absorbed energy along the (x) axis (along thickness) created in the glass while irradiated. The distribution of the absorbed energy across the glass sheet surfaces is assumed to be uniform.

From this heat equation, it is possible to estimate the minimal possible heating time (t), which creates the maximal temperature difference ($\Delta T_{max}$) inside a glass sheet (i.e., the maximum temperature differential between the most interior glass layer and the external surface of the sheet) and the correspondent maximal internal stress ($\sigma_T max$) that would be low enough to avoid glass cracking or in other words $\sigma_T max < MoR$, where MoR is the mean modulus of rupture and $\sigma_T max = Ks\Delta T_{max}$ (where Ks is the coefficient of thermal stress) (see, e.g., E. B. Shand, *Glass Engineering Handbook*. $2^{nd}$ Edition, McGraw Book Company, Inc., New York, Toronto, London, 1958, pp. 112–117]

This time (t) can be estimated by calculating the temperature distribution inside the glass, multiplying the difference between the average temperature and the minimal (or maximal) temperature ($\Delta T_{max}$) by the thermal stress coefficient (Ks) and comparing this value to MoR. These calculations can be made for different power densities and requencies (in fact, not only for the infrared frequency range) of radiation applied to glass.

The calculations are based on the following properties of soda-lime float glass at room temperature with a thickness ($\delta$) of 4 mm and are taken from E. B. Shand, *Glass Engineering Handbook $2^{nd}$ Edition*, McGraw-Hill Book Company, Inc., 1958, pp. 23, 25, 28 and 112–113 and *Physical Properties of Glass*, J. E. Stanworth, Oxford, Clarendon Press, 1953, pg. 105: Soda-lime float glass is the glass used in this example because it is the type of glass that is most widely used in the production of automotive and architectural glasses.

$\eta = 0.937 W/(m \,°\, C.)$;

$c = 0.21 \, cal/(g \,°\, C.)$;

$\rho = 2530 \, kg/m^3$;

$Ks = 0.62 \, MPa/° C.$;

$MoR = 41 \, MPa$.

In the exemplary calculations, Tmax is selected at 640° C., room temperature To is selected as 27° C. The calculations are made for a glass sheet heated by infrared radiation with a mean wavelength of >4 microns. Infrared radiation with a power density $I_0$ heats the glass from both sides and penetrates into the glass only to the depth, $d < 0.3$ mm (see for example, E. B. Shand, *Glass Engineering Handbook, Second Edition*, McGraw Book Company, Inc., New York, Toronto, London, 1958, p 62). $Q(x)$ (i.e., the distribution of absorbed energy along the (x) axis in the irradiated glass) is calculated as:

$$Q(x) = (I_0/d)\{\exp(-x/d) + \exp(-(\delta-x)/d)\}.$$

The results of these calculations are shown in an alignment chart below (see Table 1).

TABLE 1

| $I_0$ (W/cm$^2$) | 2 | 3 | 5 | 7.4 | 7.5 |
|---|---|---|---|---|---|
| (MoR-Ks$\Delta$Tmax)/MoR | 0.76 | 0.62 | 0.34 | 0.005 | <0 |
| t (sec.) | >400 | 170 | 85 | 54 | break |

The data presented in Table 1 illustrate that even when the external glass surfaces are heated absolutely uniformly by infrared radiation, there is a lower limit to the heating time (i.e. dozens of seconds) and the corresponding increasing heating rate is lower than around 12° C./s (for heating glass from room temperature). This result is applicable to convection heat as well, or to its combination with infrared radiation. In fact, the actual increasing heating rate is significantly lower. For example, for a 4 mm glass sheet, the rate of heating is not higher than 6° C./s–8° C./s because of the problems experienced in uniformly heating the glass surfaces. But, even in the best case, the limitation in the heating time (the increasing heating rate) makes the use of long tunnel type furnaces inevitable, as confirmed by worldwide industrial practice.

Thus, the time required for heating glass by common infrared radiation or any convection heat source is too long for the elimination of tunnel type furnaces and it is impossible to reduce this heating time without changing the glass properties. Changing these properties requires increasing the glass transparency to infrared radiation and increasing the glass thermal conductivity. However, this solution is impractical because glass windows that are highly transparent to infrared or convectional radiation have high thermal conductivity and do not protect from outside heat and cold. Consequently, such glass windows are virtually worthless.

SUMMARY OF THE INVENTION

According to the present invention, a method is provided for the thermal treatment of any glass or glass-like material that is processible by controlled heating without using conventional tunnel-type furnaces. Glass-like materials include those materials that contain glass powders, glass threads and the like. These products prepared using these treatments include but are not limited to windshields, side windows and rear windows for vehicles such as automobiles and the like as well as architectural glass, products made from fiberglass and comparable products. The inventive method utilizes microwave radiation to rapidly heat the material to be thermally treated (e.g., a glass sheet) starting from any initial temperature. It is understood that the initial temperature of the glass sheet includes any cooled temperature below room temperature, room temperature and any temperature above room temperature up to the softening temperature of the particular glass treated.

The inventive method avoids the use of bulky and inefficient tunnel-type furnaces and is particularly applicable to glass shaping, bending, tempering, annealing, coating, floating, and the like. Architectural window glass and similar materials can also be thermally heated using this method, as well as other glass items where thermal treatment of glass sheets is required. The inventive method can also be used to volumetrically dry fiberglass and other inorganic materials with low thermal conductivity and which are non-transparent to infrared and convectional heat. Once the glass sheet is thermally treated using the inventive method, other known processing steps can be employed to complete the shaping, bending, tempering, annealing, coating or floating of the glass sheet. These steps are exemplified in the U.S. Patents set forth in the BACKGROUND OF THE INVENTION and are hereby incorporated by reference.

U.S. Pat. No. 5,827,345 recognized that if a glass sheet is below its softening point, the application of microwave energy may break the glass sheet. Indeed, in actual practice, microwave radiation has not been used to heat glass sheets from room temperature to a temperature suitable for the production of large size glass-based products such as windows, mats and the like.

The inventive method differs from previous methods for the thermal treatment of glass using microwave radiation in that the inventive method enables the whole glass sheet or any localized areas therein to be safely (i.e., without cracking) and controllably heated from any initial temperature to any required temperature (including a softened temperature) in a short selected time with high efficiency. Other differences between the previously used microwave-based heating methodologies and the inventive method are set forth in the DETAILED DESCRIPTION OF THE INVENTION and include inter alia these features of the inventive method; the selection of optimal wavelengths (frequencies, including those corresponding to the thickness of the irradiated glass sheet) for the applied microwave radiation, the equalization of the power (temperature) distributions in the interior of the glass sheet during microwave heating, the continuous adjustment of the applied microwave power density with the increasing temperature of the glass sheet (where increasing temperature is correlated with changing glass properties), the definition of the optimal microwave power distribution uniformity (which is required for high speed heating) and the heating of the glass sheet through the shaping/bending tool as well as the heating of the tool itself.

The main advantages of this high-speed method are reducing manufacturing costs and increasing production rate. Many other specific advantages also exist s including but not limited to the elimination of the cost and issues of transporting and transferring hot glass to, for example, a press site, compacting the size of the apparatus, increasing quality of the final product after annealing, shaping, bending, annealing and tempering and simplifying the shaping/bending tool.

DETAILED DESCRIPTION OF THE INVENTION

Figure 1:
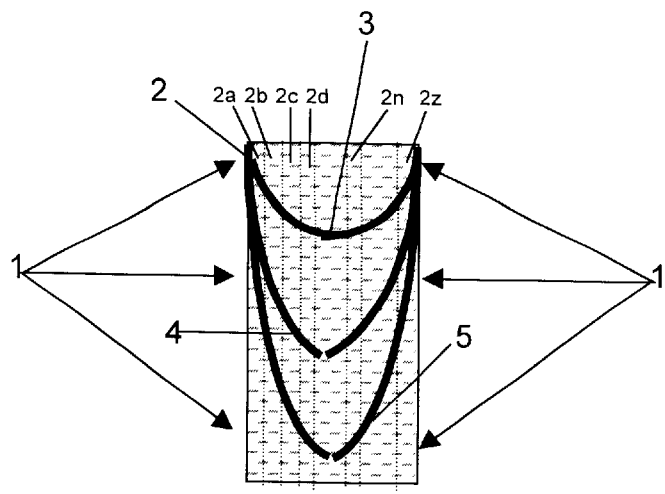
FIG. 1 illustrates prior art methods of achieving different temperature profiles inside a glass sheet when infrared or other non-transparent heat such as conventional radiation is used.

The present invention relates to a method of thermally treating a glass or glass-like materials, preferably a glass sheet, without the use of conventional tunnel-type furnaces, to effect rapid heating of glass and glass-like materials from any initial temperature to any required temperature so that the glass sheet can be processed by shaping, bending, tempering, annealing, coating and floating of the glass sheet without cracking of the glass sheet. In the inventive method a microwave radiation with appropriate uniformity, frequency and power density is used. In all of the embodiments of the invention, the wavelength (frequency) of the microwave and power density of the applied microwave radiation are important parameters of the inventive method which must be determined for each type and thickness of glass sheet processed. The process parameters are chosen so as to accomplish glass heating from any initial temperature to any required (e.g., softened) temperature in a selected short time while ensuring that the temperature distribution on the external surfaces and in the interior of the glass sheet that arises from microwave exposure is uniform enough to prevent the exposed glass sheet's internal thermal stress from exceeding its modulus of rupture, thereby avoiding glass breakage. Once the glass sheet has been rapidly heated using the inventive method, it can be shaped, bent, tempered, annealed, coated or float processed without cracking using process steps and equipment which are well-known in the art as discussed above.

These parameters and how they are chosen are generally described below for the embodiment of the invention in which a flat glass sheet is placed in a fixture (i.e. for shaping/bending/tempering) and heated by microwave radiation. However, it is understood that the same parameters and their choices are applicable to and must be considered in the alternative embodiments of the invention described above wherein a glass sheet is tempered, annealed, coated or float processed.

The inventive method is generally applicable to the thermal treatment of any type of glass or glass-like material or any inorganic material that contains such materials and is processible by controlled heating. These treatments include but are not limited to the glass sheet employed in the production of windshields, side windows, and rear windows for vehicles such as automobiles and the like and the production of architectural window glass and related materials. Controlled heating achieves rapid heating of the glass sheets starting from any initial temperature to any required (e.g., softened) temperature while in a stationary position (e.g., directly at the shaping site) without using a tunnel or other type of long furnace that requires movement of the glass sheet through the furnace during heating.

The inventive method is described in detail below for the embodiment of the invention in which a glass sheet is heated with microwave radiation of varying power densities with and without a reflector. It is understood that the description is applicable to the embodiments of the invention in which the suitably heated glass sheet is shaped, bent and/or tempered.

FREQUENCY AND POWER DENSITY OF THE INCIDENT MICROWAVE RADIATION

The frequency of the incident microwave radiation is an important variable in the inventive method. The particular frequency chosen should ensure maximum uniformity of glass heating throughout the thickness of the glass sheet. In addition, the chosen frequency should be cost effective and microwave generators for the selected frequency should be readily available at the required power.

When microwave radiation 6 is applied to a glass sheet 2 (see FIG. 2), the microwave radiation passes through the glass sheet 2 and heats it. The glass layers that are closest to the microwave radiation source (e.g., external surface layer 2a) absorbs part of the microwave radiation 6 and, consequently, the next layer (e.g., 2b) is heated less. As a result, a temperature differential is created inside the glass sheet if the heating time is short enough provided that the thermal conductivity of the glass sheet does not or only slightly equalizes the temperature distribution set up within the glass sheet. If a lower microwave radiation frequency is chosen for irradiation, it creates a lower temperature differential (see temperature profile curve 7) because of the low absorption of the microwave radiation by the glass (see, for example, E. B. Shand *Glass Engineering Handbook*, $2^{nd}$ *Edition* pages 73–75). Thus, lower frequency microwave radiation allows a higher increasing heating rate to be achieved than using a higher microwave radiation frequency (see temperature profile curve 8). However, the lower microwave radiation frequency requires a more powerful microwave source to achieve the desirable increasing heating rate (i.e., short heating time).

Figure 2:
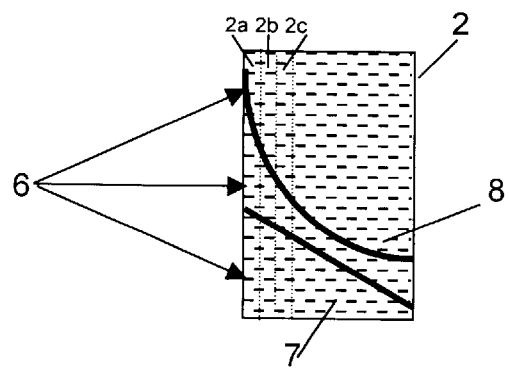
FIG. 2 illustrates the different temperature profiles (which create thermal stresses in the interior of the glass sheet) that are obtained in the interior of the glass sheet when it is irradiated on one external surface by microwave radiation and how the shape of the profile can be controlled by the microwave frequency selected.

FIG. 2 illustrates, in general, what temperature distributions can be produced in the interior of a glass sheet when the sheet is irradiated by microwave radiation of different frequencies. However, FIG. 2 is not meant to illustrate the particular temperature distributions that must be attained for the success of the inventive method. However, it is clear from FIG. 2, that depending on the characteristics of the heated glass sheet and its thickness, the necessary temperature distribution (i.e., a distribution which creates an internal stress that does not exceed the modulus of rupture) can be id achieved by selected the appropriate microwave radiation frequency.

This situation holds true if the applied microwave radiation is appropriately uniform and does not create an additional temperature differential, especially in the interior layers of the glass sheet that can break the glass. In other words, any temperature differential ($\Delta T$) arising from the non-uniformity of the microwave power should not create a thermal stress that exceeds the glass modulus of rupture.

$$K_s \Delta T < MoR$$

The temperature differential ($\Delta T$) is proportional to the non-uniformity of the power density ($1-\psi$) where $\psi$ is the degree of uniformity. Therefore, $\psi \geq 100\% \{1-MoR/(K_s\Delta T)\}$. Since the Modulus of Rupture depends on temperature and alters during changing temperature (see, for example, J. E. Stanworth, *Physical Properties of Glass*, Oxford at the Clarendon Press, 1953, pg. 105' E. B. Shand, *Glass Engineering Handbook*, 2$^{nd}$ *Edition*, McGraw-Hill Book Company, Inc., New Your, Toronto, London, 1958, pgs. 33, 38 and 53; Dr. Fay V. Tooley, *The Handbook of Glass Manufacture*, 3$^{rd}$ *Edition*, Books for the Glass Industry Division, Ashlee Publishing Co., Inc., 1984, pg. 901), MoR should be selected at its minimum point and the thermal stress coefficient (Ks) should be selected at its maximum point.

Figure 3:
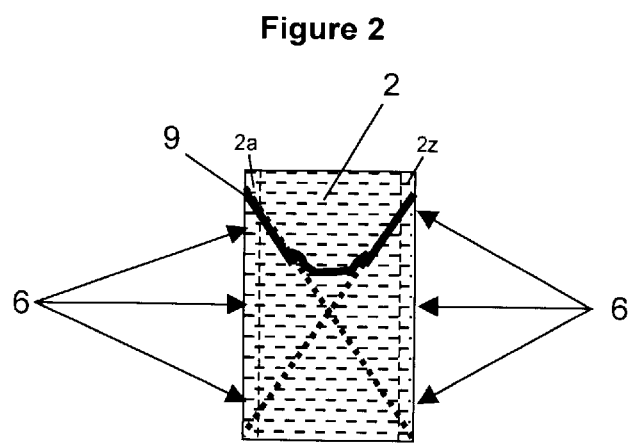
FIG. 3 illustrates the temperature profiles inside a glass sheet when it is irradiated by microwave radiation from both sides simultaneously using the inventive method.

The temperature differential inside the glass sheet can be reduced (see temperature profile curve 9) and the increasing heating rate can be augmented if the microwave radiation 6 is applied to both external surfaces of the glass sheet 2*a* and 2*z* simultaneously (see FIG. 3).

Figure 4:
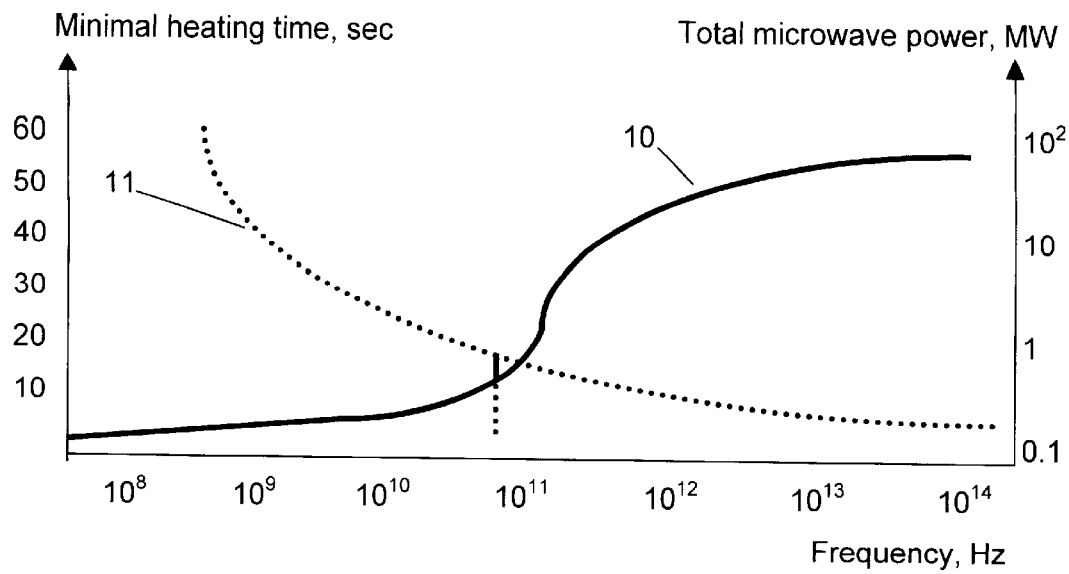
FIG. 4 graphically illustrates the minimal heating times that can be achieved for different frequencies of applied microwave radiation and the corresponding power level requirements using the inventive method.
Figure 5:
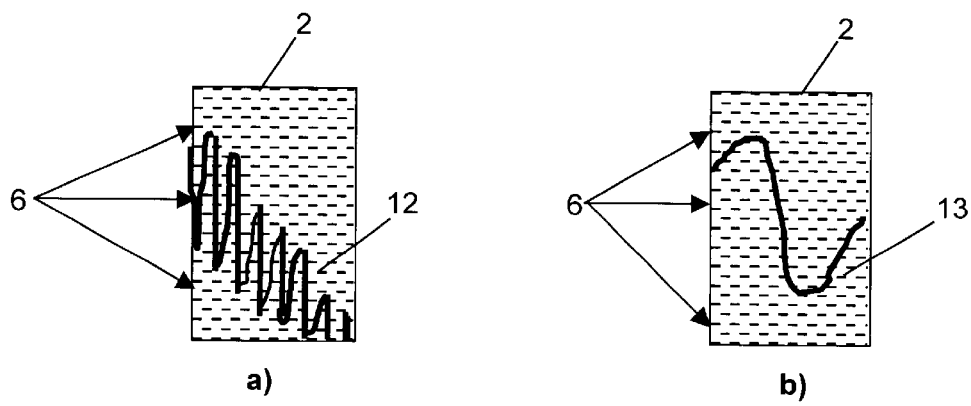
FIGS. 5*a*, 5*b*, 5*c*, and 5*d* illustrate the different microwave power distributions inside of a glass sheet for various ratios of the incident microwave wavelength in the glass sheet being heated to the glass sheet thickness using the inventive method.

Thus, the use of low frequency microwave radiation with an appropriate power density makes a low heating time possible. FIG. 4 illustrates minimal heating times 10 that can be achieved for a soda-lime float glass with a thickness of 4 mm by using microwave radiation with different frequencies following the requirements of the inventive method. The time-frequency dependence is calculated by using the same method used to calculate the minimal heating time for glass heated by infrared radiation (see BACKGROUND OF THE INVENTION). FIG. 4 also illustrates the total power of microwave radiation 11 that is needed to achieve the time for heating a 1 m$^2$ (92 sq. ft) of glass sheet for different microwave frequencies. A 1 m$^2$ glass sheet is selected for illustration because it is in the range of common sizes used in the production of different windows.

FIG. 4 shows that by using microwave radiation with a frequency lower than about 200 GHz, the time required for heating a glass sheet can be short enough to avoid the use of a tunnel furnace. However, achieving this result requires a corresponding microwave power density. The necessary power density drastically rises if the microwave frequency is lower than 10 GHz, and creates many technical and economic problems. For example, a 15 sec. heating of the glass sheet to 640° C. by using microwave radiation with a frequency of 2.45 GHz (the most common industrial microwave frequency) requires assembling a microwave installation of more than ten megawatts. However, the current state-of-the-art level of microwave technique makes it very difficult and very expensive to install a power system with power higher than even 0.1 megawatt. Therefore, the preferable microwave frequency range for the present invention is between about 10 GHz and about 200 GHz.

The most preferable microwave frequency range f for the present invention is when the incident microwave wavelength λ in the glass being heated (λ=c$_l$/f, where c$_l$ is speed of light in a vacuum) is selected in a glass thickness range that allows a drastic increase in the efficiency (at least by 3–5 times) of the applied microwave radiation.

When the thickness of a non-metallic material (e.g., a glass or glass-like material) is commensurate with the wavelength of the incident microwave radiation inside the material, a standing wave distribution of microwave power is formed (see, for example, *Principles of Optics: Electromagnetic Theory Of Propagation, Interference And Diffraction Of Light* by Max Born and Emil Wolf; with contributions by A. B. Bhatia [et al.]. 7th expanded ed. New York: Cambridge University Press, 1999.). FIGS. 5*a*, 5*b*, 5*c*, and 5*d* illustrate four different cases of this distribution in a glass sheet.

If the wavelength λ of the incident microwave radiation is significantly smaller (at least by 5–10 times) than the glass thickness δ (i.e., the frequency is very high), the standing wave distribution has an attenuated oscillation form 12 (see FIG. 5*a*) and forms a resulting temperature distribution that is close to that obtained with infrared irradiation and hence, not appropriate for the inventive method. When λ=δ, (13), λ=2 δ (14), or λ=4 δ (15) (FIGS. 5*b–d*, respectively), all or part of the microwave generated standing wave appears to be inside of the glass sheet and the efficiency of using microwave radiation increases significantly.

Figure 6:
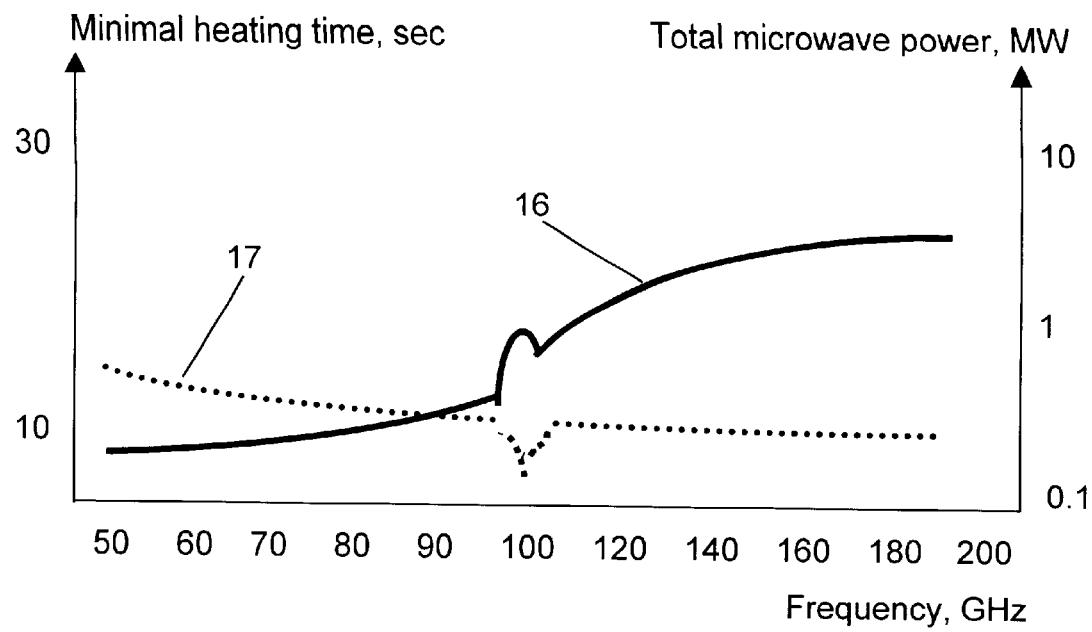
FIG. 6 graphically illustrates the minimal heating time that can be achieved using applied microwave radiation with wavelengths between two and eight glass thicknesses (in a glass or glass-like material being heated) and the corresponding power level requirements using the inventive method.

FIG. 6, illustrates the minimal heating time 16 that can be achieved for a soda-lime float glass sheet with a thickness of 4 mm by using different microwave frequencies that correspond to a wavelength λ between about λ$_1$=4 δ and λ$_2$=δ. Because ϵ for the microwave radiation in the glass sheet is around 7.4, the microwave frequencies corresponding to these wavelengths are between 50 GHz and 200 GHz. (These values are calculated as f$_1$=c$_l$/λ$_1$, and f$_2$=c$_l$/λ$_2$; λ$_{1,2}$=4 δϵ$^{-½}$)

The time dependence is calculated using the same method used for the calculation of the minimal heating time for glass heated by infrared radiation (see BACKGROUND OF THE INVENTION). In this calculation, the distribution of absorbed energy inside the glass sheet exposed to radiation Q(x), is calculated as:

$$Q(x)=I_{0m} \sin^2(\pi x/\delta),$$

where I$_{0m}$ is the microwave power density.

FIG. 6 also illustrates the total power of microwave radiation 17 needed to achieve the corresponding heating time for a 1 m$^2$ (92 sq. ft) soda-lime glass sheet for microwave frequencies between about 50 GHz and about 200 GHz.

The graph in FIG. 6 shows that microwave energy with a frequency corresponding to λ=2 δ (around 100 GHz for said glass) is most preferred because these parameters provide the most effective way to heat glass (the required power level drops by several times); i.e., a comparatively short heating time can be achieved using a reasonable microwave power. For example, to achieve a 15 sec. heating of the 1 m$^2$ glass sheet to 640° C. with microwave radiation of a frequency of about 100 GHz requires a generator of around 200 KW power. Gyrotrons capable of supplying microwave radiation at these frequencies and power densities are commercially available (see, e.g., *Introduction To Gyro Devices*, Varian, pg. 19). Today's market price for such equipment is dozens of times cheaper than a comparable tunnel furnace and the efficiency of using heat energy in this case is dozens of times better than in conventional tunnel furnaces.

The heating time can be further reduced by adjusting the microwave power density in relation to the changing glass internal stress and modulus of rupture during the heating.

As noted above, the volumes of internal stress and modulus of rupture of the glass sheet change during heating. The internal stress ($\sigma_T$) is proportional to the temperature differential inside the glass sheet (ΔT) as $$\sigma_T=Ks\Delta T,$$

where ΔT is primarily dependent on the level of microwave power density.

Therefore, the maximal power density I$_{0m}$max that will still ensure that the internal thermal stress does not exceed the modulus of rupture for any achieved glass temperature is related to these parameters as follows:

$$I_{0m}\max(T) \sim MoR/Ks,$$

and can be changed during the heating following the changing MoR and Ks from the glass temperature $$I_{0m}\max(T)=I_{0m}\max(T_i)MoR/Ks,$$

where $I_{O_m}max(T_r)$ is the selected starting power density for heating glass from its initial temperature ($T_r$). This initial power density can be calculated or found experimentally.

The coefficient of internal thermal stress (Ks) as well as the modulus of rupture (MoR) can be found in technical literature, handbooks, catalogs and other sources (see, for example, the references given above).

The $I_{O_m}max(T)$ for all heating processes can be estimated as well. Table 2 shows the values of $I_{O_m}max$ for different temperature ranges. The calculations are made for the heating of a soda-lime glass sheet with a thickness ($\delta$) of 4 mm by microwave radiation with a frequency of 100 GHz. The calculation is based on the heat equation used previously.

TABLE 2

| T° C. | 27–100 | 100–200 | 200–300 | 300–400 | 400–500 | 500–640 |
|---|---|---|---|---|---|---|
| $I_{O_m}max$, W/cm² | 20* | 12 | 14 | 20 | 35 | 70 |

Note: * is the starting power density

The calculation indicates a reduction of heating time by almost a factor of 2 if the microwave power density continues to change the coefficient of internal thermal stress and modulus of rupture during heating.

Figure 7:
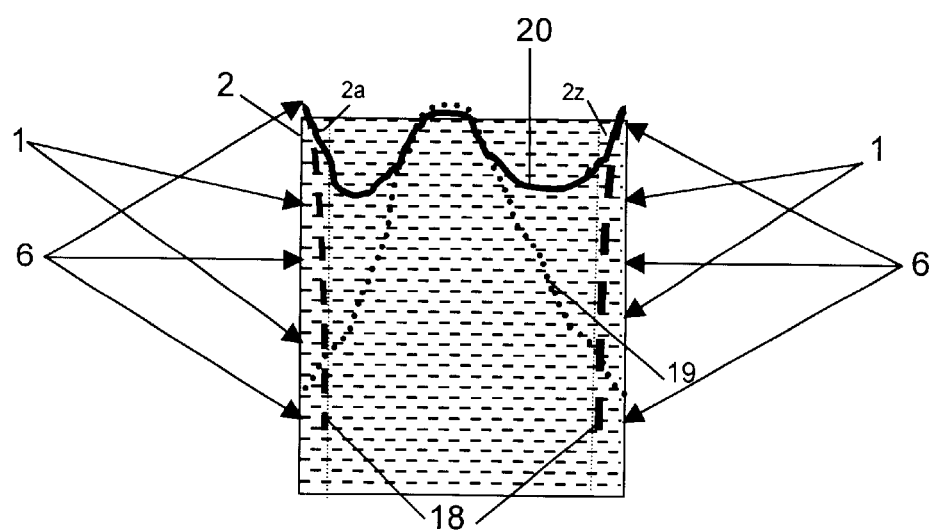
FIG. 7 illustrates the different temperature profiles achieved inside the glass sheet when it is irradiated simultaneously by microwave and infrared radiation from both sides of the glass sheet using the inventive method.

In the embodiments of the invention discussed above, heating time as well as cost can be reduced by at least 10%–20% by using microwave radiation 6 and an additional electromagnetic or convection heat source 1, or both (see FIG. 7). In this case, the microwave radiation heats the glass sheet 2 from inside and creates its own temperature distribution (see temperature profile curve 19) in the interior of the sheet and the additional heat source(s) heat(s) the glass on the external surfaces 2a and 2z and create(s) a corresponding temperature differential (see temperature profile curve 18). The resultant temperature profile from the coupled heat sources 20 is more uniform than that obtained from the individual heat sources.

The wavelength of the additional electromagnetic source is selected to be significantly shorter (at least ten times shorter) than the glass sheet thickness so that only the interior layers of the glass sheet are heated. The power density of the electromagnetic or convection source, or the sum of the two, is selected to be sufficient to heat the glass sheet external surface(s) with the same increasing heating rate as the microwave radiation which heats the interior of the glass sheet.

Infrared radiation, ultraviolet radiation, laser, X-ray and the like can be used as the additional electromagnetic heat source. Natural gas, hot air, and the like can be used as a convection heat source.

Figure 8:
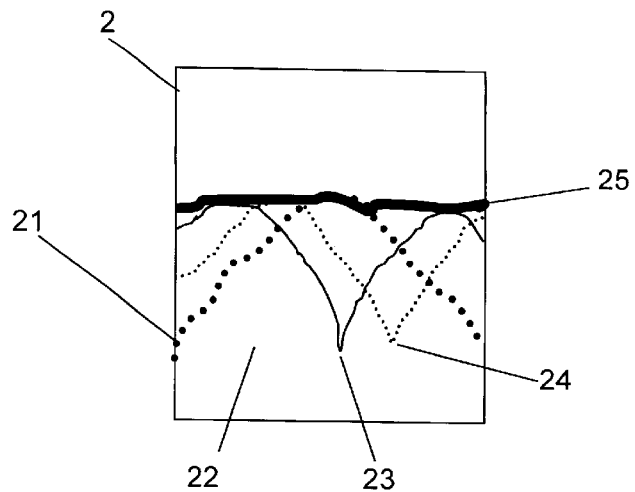
FIG. 8 illustrates the different temperature profiles achieved inside the glass sheet when it is irradiated by microwave radiation with a wavelength of about two glass thicknesses in the glass being heated and power distribution is continuously oscillating within glass thickness using the inventive method.

The standing wave type of the microwave power distribution 21 (see FIG. 8) allows the equalization of the power and temperature distribution inside the glass sheet 2 by continuously moving (oscillating) this distribution 22, 23, 24 within the glass thickness during irradiation. It is clear that the period ($T_{osc}$) of the oscillation should be sufficiently short (i.e., the frequency is sufficiently high) so that $I_{O_m}max$ (T) glass temperature ($\Delta T$) during this time (period of the oscillation) should not create the thermal stress that exceeds the glass modulus of rupture. In other words $$I_{O_m}max(T)T_{osc}=\delta c^*\rho^*MoR^*/Ks \text{ or } w=1/T_{osc}=Ks^{**}I_{O_m}max(T)/\delta c^*\rho^*MoR^*$$

where all parameters that depend on temperature and change during heating are selected at their minimum point (identified by one asterisk) except thermal stress coefficient (Ks-identified by two asterisks) which is selected at its maximum point.

By selecting the appropriate frequency of oscillation ($w_{opt} \geq w$) a very high uniform distribution of microwave power and a corresponding distribution temperature (see temperature profile curve 25, see FIG. 8) can be reached. Temperature profile curve 25 is the result of the addition of temperature profile curves 21–24. Oscillation allows a very short heating time of the glass sheet to be achieved.

The standing wave type of the microwave power distribution is a result of interference between the transmitted microwaves and those reflected from the opposing external surface of the glass sheet. In one embodiment of the invention, a reflector is placed behind the glass sheet to intensify this interference. The distance (L) between the reflector and the closest glass external surface corresponds to $L=k\lambda/2$, where $\lambda=c_f/f$, f is the selected microwave frequency and k is 1, 2, 3, .... A special metal plate, fixture or its part, and the like can be used as a reflector.

In the embodiments of the invention discussed above, a uniform distribution of microwave power (temperature) inside the irradiated glass is achieved and a corresponding short heating time is attained by oscillating the distance between the reflector and the glass sheet external surface within around $\frac{1}{4}\lambda$ and with the oscillation frequency selected as described above.

Figure 9A:
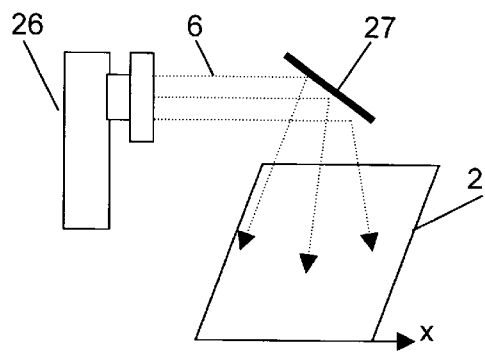
FIGS. 9a and 9b schematically illustrates alternative embodiments of the invention in which one local place(s) of the glass sheet is heated to a higher temperature than the whole sheet and FIG. 9c illustrates the power distribution that is achieved therein.
Figure 9B:
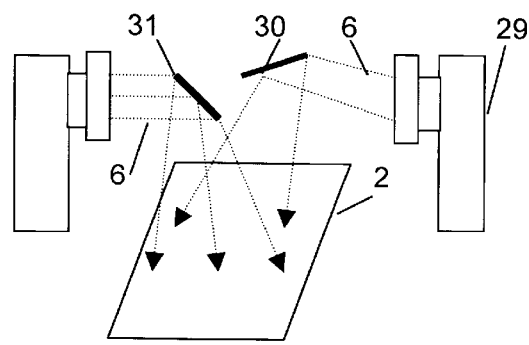
Figure 9C:
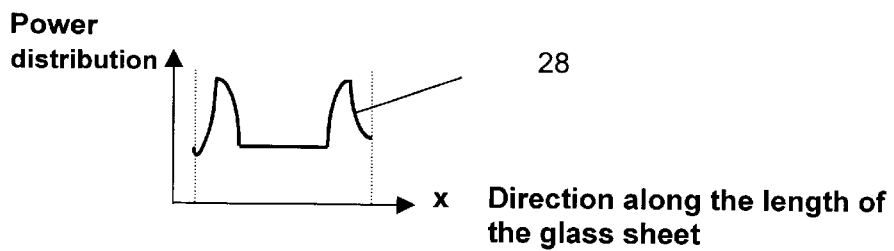

Selecting a millimetric wavelength range (i.e., a dozens of gigahertz range) for the microwave radiation allows generators that produce concentrated controllable power (such as gyrotrons) to be used. Using this wavelength range allows the necessary part of the microwave power 6 (see FIG. 9a) generated by the gyrotron 26 to be focused in a local space(s) (for example, an edge area(s) of the glass sheet 2) allowing the rapid heating of the entire volume of these area(s) to a higher temperature than the whole. This can be conducted at the end of the heating process, just before bending by using a special mirror 27 with a variable reflecting surface (see for example U.S. Ser. No. 09/439,533 filed on Nov. 12, 1999) that achieves the necessary microwave power distribution 28 (FIG. 9c). Such a power distribution can also be achieved by adding an additional gyrotron 29 and an additional mirror 30 (to common focusing mirror 31) that divides, focuses, and directs the microwaves to local area(s) (FIG. 9b). This gyrotron is selected with a wavelength that is not longer than the required size of the heated local area. The present invention allows these areas to be heated very rapidly (in seconds or even in fractions of a second) and its size can be very narrow, up to the size of about a microwave wavelength (up to a few millimeters).

Figure 10:
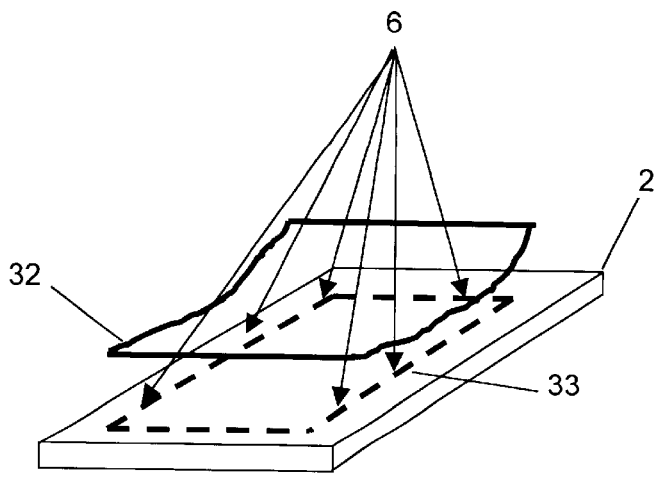
FIG. 10 schematically illustrates an alternative embodiment of the invention in which controllable heating of the shaping/bending system is provided.

The present invention provides controllable heating of the shaping/bending system, located in a heated environment, to a sufficient processing temperature. Press elements 32 and 33 of this system (see FIG. 10) are made from a material that is semi transparent to the applied microwave radiation 6 such as a high temperature non-metallic material, i.e., oxide ceramics (including alumina and MgO), nitride ceramics (including $Si_3N_4$), quartz, and the like. The present invention also allows continued heating of the glass sheet even during a pressing or gravity shaping operation. Microwave radiation 6 passes through pressing tool 32 and continues to heat the glass sheet 2. The temperature of the shaping/bending elements as well as the required level of follow up heating can be controlled by the selection of microwave power density and the absorption properties of the material used to construct the shaping/bending system.

The present invention provides an exclusively controllable temperature distribution inside the glass sheet in the whole temperature range that can be used for any processes which involve increasing and reducing the temperature of the glass sheet such as annealing, tempering, and the like when a cooling gas agent such as cold air and the like is applied to the outer glass surfaces. By selecting microwave radiation with a wavelength equal to about two thicknesses of the glass sheet being treated, it is possible to achieve any temperature differential between the outer glass surfaces and any layers inside the glass sheet during temperature reduction. As a result, the glass quality such as strength, remaining strain, optical properties and so forth can be radically increased. The described effect becomes accentuated if the glass sheet is irradiated by the microwave radiation from both external glass surfaces or sides or if the reflector is placed behind the glass sheet at a distance from the glass surface furthest from the microwave source side that is equal to 0, 1, 2, . . . multiplied by ½ wavelengths in a vacuum corresponding to the selected frequency. (The figure 0 means that the reflector can be placed directly on the glass surface opposite the impinging microwave radiation).

The present invention also provides the opportunity for controllable heating of only local surface layers by selecting the gyrotron wavelength. For example, in a float glass process, this option can be utilized to improve temperature distribution inside the glass sheet that is created by hot tin. By selecting the microwave wavelength as about 12 complex parts of the refraction index in the glass sheet being heated multiplied by the required depth of heating and by the selection of an appropriate power density, the required temperature distribution can be improved (equalized). The temperature distribution can be improved if the glass sheet has already been heated to 400° C. and higher (which usually takes place in the float glass process).

The present invention also provides an opportunity for controllable heating of a thin local surface layer of a glass sheet. For this option, if the glass is at an initial temperature less than 400° C., the microwave radiation frequency is selected to correspond to a wavelength of about four thicknesses of the glass sheet being heated. The desired controllable heating can be further enhanced by placing the reflector behind the glass sheet at a distance from the treated glass surface layer that is equal to 0, 1, 2 . . . multiplied by ½ wavelength in a vacuum corresponding to the selected frequency.

The present invention also provides the opportunity for controllable fast drying of materials based on glass e.g., fiberglass mats). For this option, the microwave radiation frequency is selected to correspond to a wavelength of about two thicknesses of the material being heated. The wavelength $\lambda_{dr}$ estimated as $$\lambda_{dr}=2\delta(\Omega_1\epsilon+\Omega_2\epsilon_w)^{-1/2}$$

Where $\Omega_1$ is the percentage of glass in the material, $\Omega_2$ is the percentage of material wetness and $\epsilon_w$ is the water dielectric constant. The effectiveness of heating can be further enhanced by placing the reflector behind the material at a distance from the treated surface layer that is equal to 1, 2 . . . multiplied by ½ wavelength in a vacuum corresponding to the selected frequency.

MICROWAVE SOURCE AND IRRADIATION SET-UP

Figure 11:
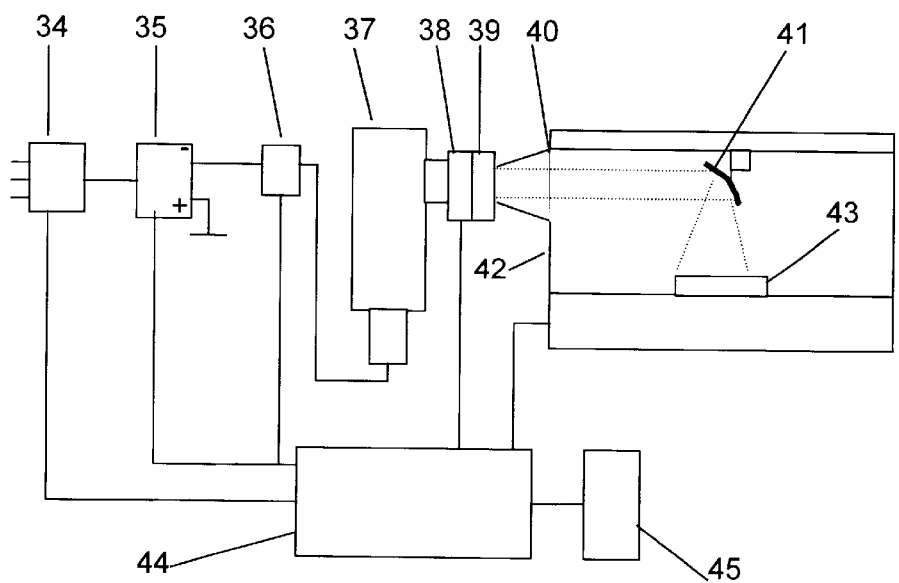
FIG. 11 is a block diagram illustrating the basic gyrotron beam installation used in the inventive method.

Microwave radiation with the necessary frequency and power density can be achieved using generators such as the gyrotron, klystron, and the like. In FIG. 11 an example of a microwave installation that can be used in the inventive method is illustrated.

The microwave unit consists of a gyrotron 37 that operates at a frequency of 82.9 GHz (wavelength $\lambda \approx 3.62$ mm) with a maximum output CW power of 40 kilowatts. The gyrotron is connected to a filament transformer 36 at 500 W (208V/25V) and a power supply 35 at 240V/35 KV, I—up to 3A, power—up to 90 KW. The microwave beam passes through a waveguide 40 into a chamber 42 where it is directed with a mirror 41 to a sample area 43. The sample area may also includes fixtures, reflectors and the like necessary to each particular embodiment of the invention which are not illustrated in FIG. 11. The mirror ensures uniform distribution of microwave power over the sample area up to 0.2 m². As set forth above, a uniformity of 96% is more than is required for the inventive method.

Microwave power is adjusted by a thyristor power regulator/switcher 34 and measured by a colorimeter 38 which is installed in a gyrotron output window 39. Microwave power and all other parameters of the gyrotron are monitored by a control panel 44. Shutting down the gyrotron at the moment when the required softened glass temperature is achieved automatically controls the heating time. The time is calculated by an electronic stopwatch with an accuracy about 0.2 sec. The microwave installation optionally includes infrared heaters, elements necessary to cool the samples, pyrometer Minolta/Land Cyclops 300/AF, and other equipment. The control panel has a special electronics device that can change the microwave power as the glass temperature rises. Optionally, these changes can be controlled by a computer 45 and the computer can be programmed to effect these changes in different ways.

It is understood that the particular installation illustrated in FIG. 11 is optimally designed for research and development or demonstration testing of the inventive method. A person of ordinary skill in the art can easily modify the installation for manufacturing processes of various scales. Using this setup, it is possible to perform heating of the glass sheet from room to softened temperature, while monitoring the microwave power density and processing time.

EXEMPLARY DETERMINATION OF PROCESS PARAMETERS

The following examples are presented to provide a more detailed explanation of the present invention and of the preferred embodiments thereof and are intended as illustrations and not limitations.

EXAMPLE 1

HEATING A GLASS SHEET WITH MICROWAVE RADIATION OF VARIABLE POWER DENSITIES

A 200 mm by 100 mm, 4.76 mm thick (3/16") thick ($\delta$) soda-lime float glass sheet was chosen for the heating experiments.

a) Preliminary Calculations.

The microwave parameters for heating the glass sample were determined using the following consecutive steps:

1. The optimal microwave frequency was calculated as $f=c_l/\lambda$, where $\lambda=2\delta\epsilon^{-1/2}$. This frequency is around 85.7 GHz.
2. The microwave power density that could be achieved at the sample area was estimated from the maximal microwave power (P) (i.e. 40 kW) and the glass sample area (S) (i.e. 20×10=200 cm²). The calculations indicated that the power density of the applied microwave radiation could be as high as 200 W/cm².

3. An alignment chart (see Table 3) was created to estimate the various maximal power densities $I_{0_m}$max achievable during glass heating that ensure that the internal thermal stress does not exceed the modulus of rupture for any obtainable glass temperature. The calculation used the previously described heat equation where the distribution of absorbed energy in the interior of the glass sheet exposed to microwave radiation Q(x) is calculated as:

$$Q(x)=I_{0_m} \sin^2(\pi x/\delta).$$

The calculations were carried out for six specific temperature ranges (see Table 3) within the whole heating range: from room temperature (27° C.) to 640° C. with heating of the glass sheet from one side. The dependence of the modulus of rupture was taken from J. E. Stanworth, *Physical Properties of Glass*, Oxford at the Clarendon Press, 1953, p.105 (see FIG. 13) and the coefficient of internal thermal stress was assumed to be a constant for all temperature ranges.

All calculations used the following values for the listed properties of soda-lime glass which were obtained from E. B. Shand Glass Engineering Handbook, McGraw-Hill Book Company, Inc. 1958, pgs. 23, 25, 28 and 112–13 and Physical Properties of Glass by J. E. Stanworth, Oxford at the Clarendon Press, 1953, pg. 105. Thermal conductivity= 0.937 W /(m ° C.) Specific heat=0.21 cal/(g ° C.) Density= 2530 kg/m$^3$ Thermal internal stress coefficient=0.62 MPa/° C.;

The results of the calculation are shown in the alignment chart below (see Table 3).

TABLE 3

| T° C. | 27–100 | 100–200 | 200–300 | 300–400 | 400–500 | 500–640 |
|---|---|---|---|---|---|---|
| $I_{0_m}$max, W/cm$^2$ | 50 | 34 | 36 | 48 | 85 | 180 |

The foregoing example illustrates the types of calculations that may be performed by a person skilled in the art to provide an approximation of the proper choice of parameters for the rapid heating of a glass sheet with a particular size, thickness and the specified characteristics.

Alternatively, the appropriate power density to assure the minimal heating time (the maximal increasing heating rate), which creates a temperature differential inside the glass and a corresponding internal stress that would be low enough to avoid glass breakage can be selected empirically through experimentation by processing test samples of the particular glass by irradiation with a microwave beam of varying power densities and assaying the appearance and properties of the resultant material. It is understood that a person skilled in the art will readily be able to vary these estimated parameters to optimize the inventive method for a particular kind of glass, its size and thickness.

b) Experiment

A glass sheet sample was placed into the chamber in the sample area. The glass sheet was placed in a special fixture designed to ensure reflection of the microwave power that passed through the glass sheet (i.e. the radiation that was not absorbed), back to the glass sheet. This sample arrangement also ensured that the power was reflected uniformly. The power density data from the alignment chart (Table 3) was used to monitor the microwave power during the glass heating with the above mentioned electronic device and computer. The microwave generator set up as described in FIG. 11 was switched on (a gyrotron at 82.9 GHz was used because it provided the closest match of the available gyrotrons to the required 85.7 GHz). The temperature of the sample was controlled by a pyrometer that generated corresponding electrical signals for controlling the electronic device that shuts off the gyrotron when the required temperature is achieved.

If the glass sheet did not crack during heating (as determined by visual inspection), a second sample sheet was treated with an about 5 to about 10% higher power density for each selected temperature range. When the glass started to crack, the corresponding power density was reduced by about 5 to about 10%. This parameter was separately determined for the other temperature ranges i.e. the power density for each range was increased until the glass cracked in each temperature range. Then, each corresponding power density was reduced by about 5 to about 10% and finally the optimal set of power densities was determined that ensured that the minimal needed time to heat samples from room temperature to 640° C. was achieved. When the set was found, it was tested again 30 times to achieve the value of possible minimal heating time with at least an 80% probability confidence level. If during these experiments at least one sample cracked, the corresponding power density was reduced by about 5 to about 10% and the experiment set of 30 glass sheets was conducted again from the beginning. When power densities were selected so that all 30 samples passed the tests, the average heating time achieved was calculated as the minimal heating time. The minimal time achieved in these experiments was 14 seconds, very close (+−20%) to the estimated one. Although we did not further process the heated glass sheets by bending, shaping or pressing and the like, this Example and Example 2 described below demonstrate that such further processing will not lead to cracking or a loss in quality of the glass sheet.

EXAMPLE 2

HEATING A GLASS SHEET WITH MICROWAVE RADIATION USING AN OSCILLATING REFLECTOR

A 200 mm by 100 mm soda-lime glass sheet with a thickness ($\delta$) of 4.76 mm (³⁄₁₆") was chosen for heating experiments using microwave radiation of 82.9 GHz (wavelength $\lambda \approx 3.62$ mm) and a reflector.

a) Preliminary Calculations.

1. The maximum microwave power density that could be achieved at the sample area was 200 W/cm$^2$.
2. The distance L between the reflector and the glass sheet was selected as L=k$\lambda$/2=k $c_l$/2f=5.43 mm (the coefficient K was selected equal to 3).
3. The reflector oscillation amplitude was selected as $$\Delta L=\lambda/4=cl/4f=0.9 \text{ mm}$$

4. The oscillation frequency was calculated by using the following equation listed above:

$$w=1/T_{osc}=Ks**I_{0_m}\max(T)/\lambda c*\rho*MoR*$$

All calculations used the following values for the properties of the soda-lime glass as provided in the references listed in Example 1:

Specific heat=0.21 cal/(g ° C.)
Density=2500 kg/m$^3$
Thermal internal stress coefficient 0.6 MPa/° C.;

MoR=13 MPa

Microwave power density=200 W/cm$^2$

Based on the calculation, the selected oscillation frequency (w) was estimated as 3 Hz.

d) Experiments

A glass sheet sample was placed into the chamber in the sample area in a special fixture with a thick metal plate between the fixture and the glass sheet at a distance of 6.9+/−0.1 mm from the glass. An electromechanical drive moved the plate at a distance +/−0.58 mm with an accuracy +/−0.1 mm and with a frequency from 1 to 10 Hz. The drive was then switched on and the oscillation frequency was adjusted to 3 Hz. The gyrotron was then switched on at maximum power and the glass sheet was irradiated by microwave radiation with a power density of 200 W/cm$^2$. The temperature of the sample was controlled by a pyrometer which shut down the gyrotron when a glass temperature of 640° C. was achieved.

If the glass sheet did not crack during heating, a second glass sheet was treated with an approximately 10% lower plate oscillation frequency up to the moment when the glass cracked. When this happened, the oscillation frequency was increased by about 10% and the sample was tested again (approximately 30 times) to achieve the value of the appropriate frequency with at least an 80% probability confidence level. If during these experiments at least one sample cracked, the frequency was increased an additional 10% and the experiment set of 30 glass sample sheets was conducted from the beginning. When the frequency selected using this methodology enabled all 30 samples to be treated without cracking, the frequency was accepted as the optimal frequency. The optimal frequency was around 4 Hz for the glass sample and microwave parameters, with heating time of 9 seconds.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A method of thermally treating at least one glass sheet for shaping, comprising placing the glass sheet having a temperature of up to the softening point of the glass sheet on a fixture and exposing the glass sheet to microwave radiation with uniformity ψ wherein ψ is greater than or equal to 100%{1—MoR/(KsΔT)} where the temperature dependent MoR and Ks are selected at their minimum and maximum value respectively, said microwave radiation having an effective frequency and a sufficient power density to heat at least one selected area of the glass sheet from any initial temperature up to the softening point of the glass sheet to any required temperature in a selected time whereby a sufficient temperature distribution to allow shaping of the glass sheet is obtained in the selected area so that the glass sheet's internal thermal stress is prevented from exceeding its modulus of rupture.

2. The method of claim 1 wherein the microwave power density is changed continuously during increasing glass temperature by multiplying it by the ratio of the modulus of rupture to the coefficient of internal thermal stress for the current temperature.

3. The method of claim 2 wherein both external surfaces of the glass sheet are exposed to microwave radiation.

4. The method of claim 1 wherein the microwave radiation frequency is between about 10 GHz to about 200 GHz.

5. The method of claim 1 wherein both external surfaces of the glass sheet are exposed to microwave radiation.

6. The method of claim 1 wherein the fixture is a shaping system.

7. The method of claims 1, 3, 4 or 5 wherein the microwave radiation frequency corresponds to a wavelength of about two glass thicknesses in the glass sheet being heated.

8. The method of claim 6 wherein the shaping system is made from or coated by a non-metallic high temperature material that is semi-transparent to the applied microwave radiation so that the shaping system is heated to the required temperature simultaneously with the heating of the glass sheet.

9. The method of claim 7 wherein an additional electromagnetic heat source with a wavelength that is significantly shorter than the applied microwave radiation, or a convection heat source, or both is used to heat the glass sheet wherein the power density of each source or the sum of both sources is sufficient to heat at least one external surface of the glass sheet with the same increasing heating rate as the microwave radiation heats the interior of the glass sheet.

10. The method of claim 7 wherein the distribution of microwave power in the interior of the glass sheet is continuously oscillated during irradiation of the glass sheet with the appropriate frequency.

11. The method of claim 7 wherein a reflector is placed behind the external surface of the glass sheet that is not exposed to the microwave source at a distance equal to 1, 2, 3 . . . multiplied by 2 wavelengths in a vacuum corresponding to the selected frequency.

12. The method of claim 8 wherein the non-metallic high temperature material that is semi-transparent to the applied microwave radiation is selected from the group consisting of oxide ceramics, nitride ceramics, quartz and diamond.

13. The method of claim 9 wherein the additional electromagnetic heat source is selected from the group consisting of infrared, ultraviolet, laser and X-ray heat sources.

14. The method of claim 9 wherein the additional convection heat source is selected from the group consisting of combustible gases, combustible fluids and hot air.

15. The method of claim 11 wherein the distance is continuously oscillated during heating of the glass sheet within a range of ¼ wavelength for a wavelength in a vacuum corresponding to the selected frequency.

16. The method of claim 15 wherein the oscillation frequency is selected as w≧Ks I$_{0m}$max/δ c ρ MoR and wherein all parameters that depend on temperature and change during heating are selected at their minimum value except Ks which is selected at its maximum value.

17. A method of thermally treating at least one glass sheet for bending, comprising placing the glass sheet having a temperature of up to the softening point of the glass sheet on a fixture and exposing the glass sheet to microwave radiation with uniformity ψ wherein ψ is greater than or equal to 100%{1—MoR/(KsΔT)} where the temperature dependent MoR and Ks are selected at their minimum and maximum value respectively, said microwave radiation having an effective frequency and a sufficient power density to heat at least one selected area of the glass sheet from any initial temperature up to the softening point of the glass sheet to any required temperature in a selected time whereby a sufficient temperature distribution to allow bending of the glass sheet is obtained in the selected area so that the glass sheet's internal thermal stress is prevented from exceeding its modulus of rupture.

18. The method of claim 17 wherein the fixture is a bending system.

19. The method of claim 17 wherein both external surfaces of the glass sheet are exposed to microwave radiation.

20. The method of claim 17 wherein at least one localized area of the glass sheet is heated to a higher temperature than the temperature of the remainder of the glass sheet just before bending.

21. The method of claim 17 wherein the microwave power density is changed continuously during increasing glass temperature by multiplying it by the ratio of the modulus of rupture to the coefficient of internal thermal stress for the current temperature.

22. The method of claim 18 wherein the bending system is made from or coated by a non-metallic high temperature material that is semi-transparent to the applied microwave radiation so that the bending system is heated to the required temperature simultaneously with the heating of the glass sheet.

23. The method of claim 20 wherein an effective amount of applied microwave radiation is focused on the area or areas of the glass sheet subject to bending.

24. The method of claim 20 wherein at least one localized area of the glass sheet is exposed to an additional microwave source with a wavelength not longer than the required size of the heated local area.

25. The method of claim 22 wherein the non-metallic high temperature material that is semi-transparent to the applied microwave radiation is selected from the group consisting of oxide ceramics, nitride ceramics, quartz and diamond .

26. The method of claim 17 wherein the microwave radiation frequency is between about 10 GHz to about 200 GHz.

27. The method of claim 23 wherein the microwave radiation frequency is between about 10 GHz to about 200 GHz.

28. The method of claims 17, 26 or 27 herein the microwave radiation frequency is selected to correspond to a wavelength of about two glass thicknesses in the glass sheet being heated.

29. The method of claim 28 herein an additional electromagnetic heat source with a wavelength that is significantly shorter than the applied microwave radiation, or a convection heat source, or both is used to heat the glass sheet wherein the power density of each source or the sum of both sources is sufficient to heat at least one external surface of the glass sheet with the same increasing heating rate as the microwave radiation heats the interior of the glass sheet.

30. The method of claim 28 herein the distribution of microwave power in the interior of the glass sheet is continuously oscillated during irradiation of the glass sheet with the appropriate frequency.

31. The method of claim 28 herein a reflector is placed behind the external surface of the glass sheet that is not exposed to the microwave source at a distance equal to 1, 2, 3 . . . multiplied by half a wavelength in vacuum corresponding to the selected frequency.

32. The method of claim 29 herein the additional electromagnetic heat source is selected from the group consisting of infrared, ultraviolet, laser and X-ray heat sources.

33. The method of claim 29 herein the additional convection heat source is selected from the group consisting of combustible gases, combustible fluids and hot air.

34. The method of claim 31 wherein the distance at which the reflector is placed is continuously oscillated during the glass sheet heating within a range of ¼ of the wavelength in a vacuum corresponding to the selected frequency.

35. The method of claim 30 wherein the oscillation frequency is selected as $w \geq Ks\ I_{O_m}max/\delta\ c\ \rho\ MoR$ and wherein all parameters that depend on temperature and change during heating are selected at their minimum value except Ks which is selected at its maximum value.

36. The method of claim 34 wherein the oscillation frequency is selected as $w \geq Ks\ I_{O_m}max/\delta\ c\ \rho\ MoR$ and wherein all parameters that depend on temperature and change during heating are selected at their minimum value except Ks which is selected at its maximum value.

37. A method of thermally treating at least one glass sheet for tempering and annealing comprising placing the glass sheet having a temperature of up to the softening point of the glass sheet on a fixture and exposing the glass sheet to microwave radiation with uniformity $\psi$ wherein $\psi$ is greater than or equal to 100%{1—MoR/(KsΔT)} where the temperature dependent MoR and Ks are selected at their minimum and maximum value respectively, said microwave radiation having an effective frequency and a sufficient power density to heat at least one selected area of the glass sheet from any initial temperature up to the softening point of the glass sheet to any required temperature in a selected time whereby a sufficient temperature distribution to allow tempering and annealing of the glass sheet is obtained in the selected area so that the glass sheet's internal thermal stress is prevented from exceeding its modulus of rupture.

38. The method of claim 37 wherein the microwave radiation frequency is selected to correspond to a wavelength of about two glass thicknesses in the glass sheet being treated.

39. The method of claim 37 wherein microwave radiation is applied to a local area in the interior of the glass sheet while a cooling gas agent is applied to the external surfaces of the glass sheet.

40. The method of claim 37 wherein both external surfaces of the glass sheet are exposed to microwave radiation.

41. The method of claim 38 wherein a reflector is placed behind the external surface of the glass sheet that is not exposed to the microwave source at a distance equal to 0, 1, 2, 3 . . . multiplied by a half a wavelength in a vacuum corresponding to the selected frequency.

42. A method of thermally treating at least one glass sheet for float processing, coating or drying comprising exposing the glass sheet having a temperature of up to the softening point of the glass sheet to microwave radiation with uniformity $\psi$ wherein $\psi$ is greater than or equal to 100%{1—MoR/(KsΔT)} where the temperature dependent MoR and Ks are selected at their minimum and maximum value respectively, said microwave radiation having an effective frequency and a sufficient power density to heat at least one selected area of the glass sheet from an initial temperature up to the softening point of the glass sheet to any required temperature in a selected time whereby a sufficient temperature distribution to allow float processing of the glass sheet is obtained in the selected area so that the glass sheet's internal thermal stress is prevented from exceeding its modulus of rupture.

43. The method of claim 42 wherein for a glass sheet previously heated to a temperature higher than about 425° C., the microwave radiation frequency is selected to correspond to a wavelength of about 12 complex parts of the refraction index in the glass sheet being heated multiplied by the required depth of heating.

44. The method of claim 42 wherein for a glass sheet at a temperature less than about 425° C., the microwave radiation frequency is selected to correspond to a wavelength of about four thicknesses of the glass sheet being heated.

45. The method of claim 42 wherein for a wet and non-solid glass material, the microwave radiation frequency is selected to correspond to a wavelength of about $\lambda=2\delta(\Omega_1\epsilon+\Omega_2\epsilon_w)^{-1/2}$.

46. The method of claim 45 wherein a reflector is placed behind the external surface of the glass sheet that is not exposed to the microwave source at a distance equal to 0, 1, 2, . . . multiplied by ½ of wavelength in vacuum corresponding to the selected frequency.

* * * * *